F. J. VIERLING, F. R. BARTHOLOMEW AND M. H. SMITH.
EGG BOILING RACK.
APPLICATION FILED JULY 12, 1919.
1,346,283.
Patented July 13, 1920
2 SHEETS—SHEET 1.
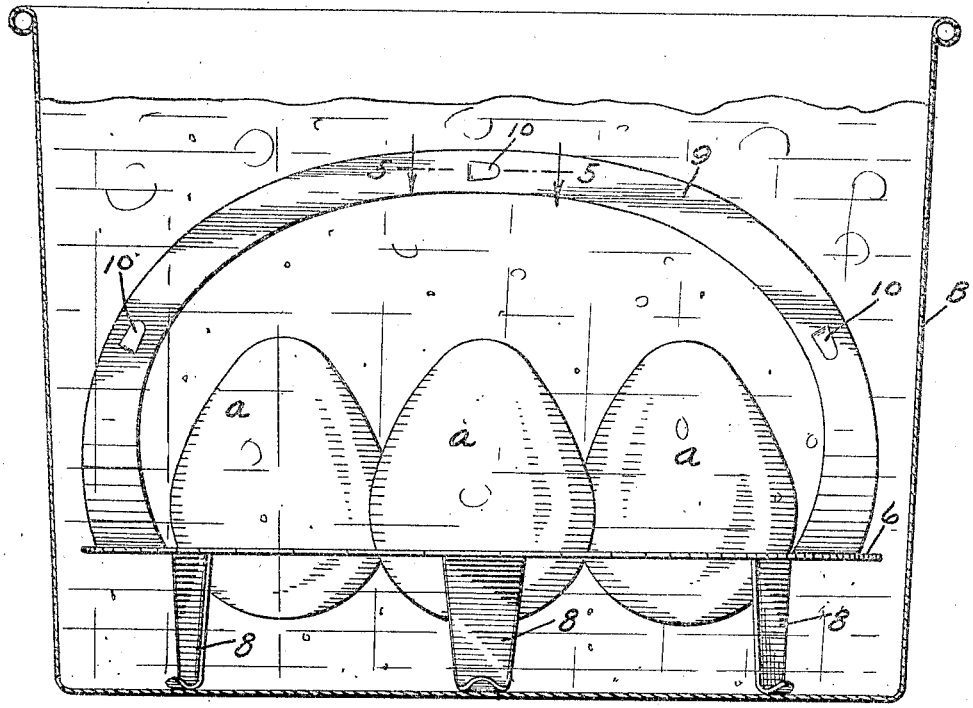
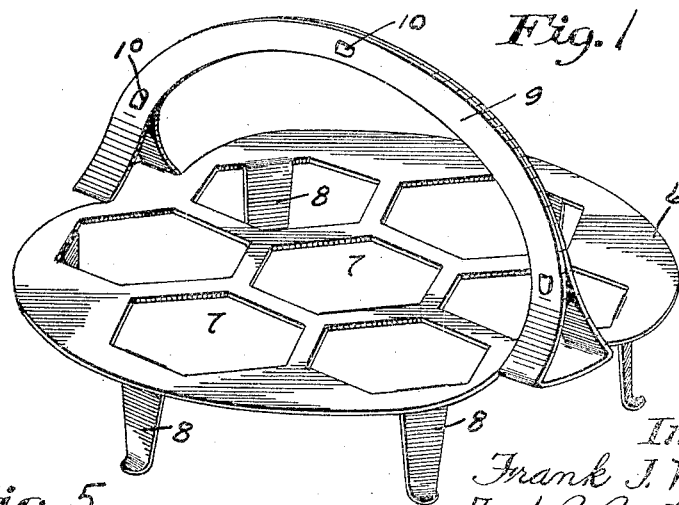
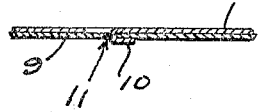

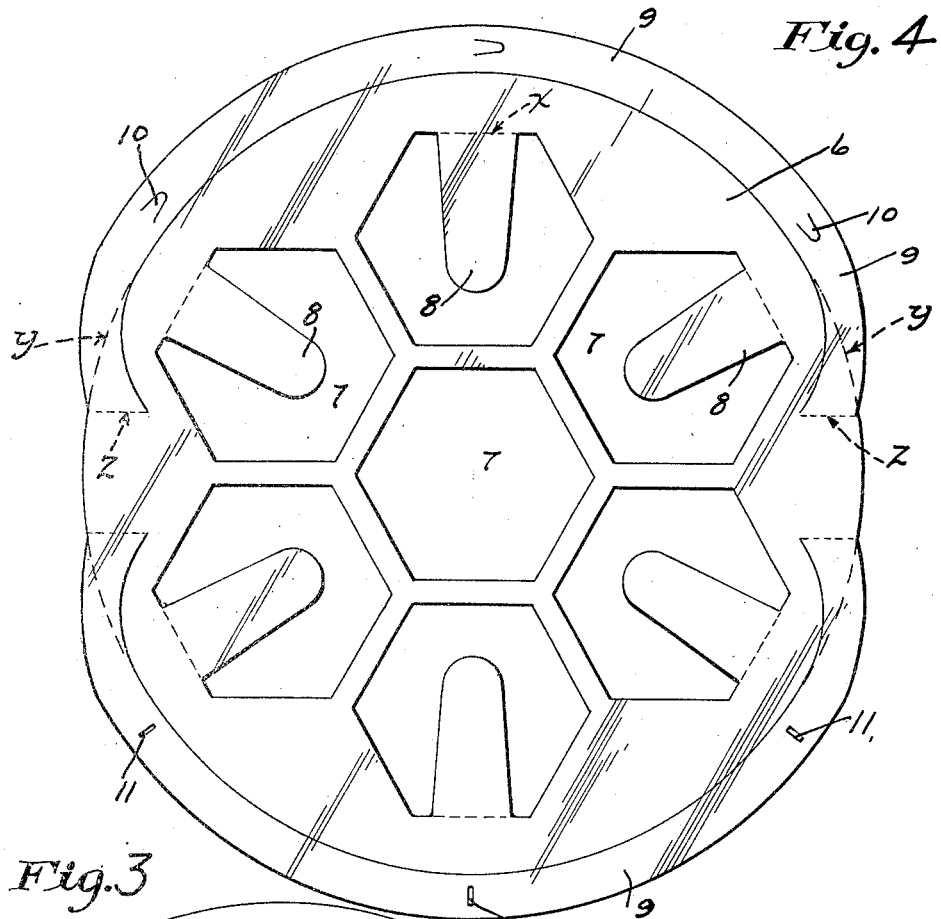
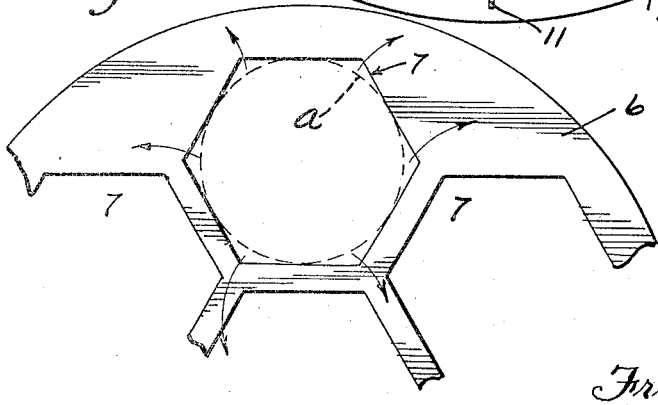

UNITED STATES PATENT OFFICE.

FRANK J. VIERLING, FRED R. BARTHOLOMEW, AND MILO H. SMITH, OF MINNEAPOLIS, MINNESOTA, ASSIGNORS TO STERLING SPECIALTIES MANUFACTURING COMPANY, OF MINNEAPOLIS, MINNESOTA, A CORPORATION OF MINNESOTA.

EGG-BOILING RACK.

1,346,283.      Specification of Letters Patent.      Patented July 13, 1920.

Application filed July 12, 1919. Serial No. 310,476.

*To all whom it may concern:*

Be it known that we, FRANK J. VIERLING, FRED R. BARTHOLOMEW, and MILO H. SMITH, citizens of the United States, residing at Minneapolis, in the county of Hennepin and State of Minnesota, have invented certain new and useful Improvements in Egg-Boiling Racks; and we do hereby declare the following to be a full, clear, and exact description of the invention, such as will enable others skilled in the art to which it appertains to make and use the same.

Our invention has for its object to provide a simple and efficient egg boiling rack that is very cheap to manufacture; and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a perspective view of the improved egg boiling rack;

Fig. 2 is a view partly in elevation and partly in central vertical section illustrating the rack filled with eggs and placed within a dish of boiling water;

Fig. 3 is a fragmentary plan view of the body of the rack;

Fig. 4 is a plan view of the blank from which the improved egg boiling rack is formed; and Fig. 5 is a detail view in section taken on the line 5—5 of Fig. 2.

The improved egg boiling rack is stamped by suitable dies, not shown, from a single sheet of metal and comprises a body member 6, having egg receiving holes 7, leg forming lips 8, and two diametrically opposite bail forming portions 9, in one of which is formed, as shown, three lips 10, and in the other of which is formed a like number of coöperating slots 11.

The rack body 6 is of annular form and the egg receiving holes 7 are located, one within the center of said body, and the others are circumferentially spaced therearound. To permit free circulation of water around the eggs *a* in the rack, the holes 7 have an irregular formation which, as shown, is hexagonal.

The leg forming lips 8 correspond in number to the outer egg receiving holes 7 and are formed from the material that is necessary to be removed to form said outer holes. The leg forming lips 8 are integral with the outermost edges of the outer egg receiving holes 7 and are adapted to be bent laterally downward on the broken lines indicated at X to afford the legs for the egg receiving rack. Preferably, as shown, the lower ends of the legs 8 are also bent laterally outward on curved lines to afford feet.

The bail forming portions 9 are located outward of the rack body 6 and are concentric therewith except at their end portions which project within the projected periphery of said body as indicated at Y by means of broken lines. These bail forming portions 9 are adapted to be bent on the lines Z laterally toward each other above the rack body 6 and connected by the coöperating lips 10 and slots 11.

In the completed egg boiling rack, the bails 9 are within the periphery of the body 6 and by thus locating said bails it is possible to place the egg boiling rack withing a pan B that is only slightly larger in diameter than said body. In the drawings, the water in the pan B is shown as extending over the bails 9, but in actual usage the water need only cover the eggs. After the eggs are placed in the rack, said rack may be placed within the pan and after cooking the desired length of time, said rack may be lifted from the pan and placed on a table, thus making it necessary to handle the eggs only at the time they are placed in the rack and when removed therefrom at the table to be eaten.

As the blanks for making the egg boiling racks come from the dies, they may be packed in flat form and shipped, thus occupying very little shipping and storing space and they may be sold to customers in this form and then bent into shape by the customers after the same have been taken home. It will thus be seen that the egg boiling racks may be very cheaply produced and shipped.

What we claim is:—

1. A sheet metal blank for making an egg boiling rack, having egg receiving holes, leg forming lips extending into certain of said holes, and two diametrically opposite bail forming portions located outward of the body of the rack and adapted to be turned into upright positions over the center of the rack.

2. A sheet metal blank for making an egg boiling rack, having egg receiving holes, leg forming lips extending into certain of said holes, and two diametrically opposite bail forming portions located outward of the body of the rack and adapted to be turned into upright positions over the center of the rack, the junction of the ends of the bail forming portions with the body of the rack being within the circular line of the periphery of said body.

3. A sheet metal blank for making an egg boiling rack, having egg receiving holes, leg forming lips extending into certain of said holes, two diametrically opposite bail forming portions located outward of the body of the rack, and a coöperating interlocking lip and slot in the bail forming portion.

4. A sheet metal blank for making an egg boiling rack, having a central egg receiving hole and outer egg receiving holes circumferentially spaced therearound, leg forming lips extending into the outer egg receiving holes, and two diametrically opposite bail forming portions located outward of the body of the rack and adapted to be turned into upright positions over the center of the rack.

5. An egg boiling rack formed from a single sheet of metal and comprising a body member having egg receiving holes, legs at the edges of certain of said holes, and two bails, the ends of which are integral with the body of the rack at diametrically opposite points and adapted to be turned into upright positions over the center of the rack.

6. An egg boiling rack formed from a single sheet of metal and comprising a body member having egg receiving holes, legs at the edges of certain of said holes, two bails, the ends of which are integral with the body of the rack at diametrically opposite points, and an interlocking lip and slot connecting said two bails.

7. An egg boiling rack formed from a single sheet of metal and comprising a body member having egg receiving holes, legs at the edges of certain of said holes, and two bails, the ends of which are integral with the body of the rack at diametrically opposite points and located within the circular line of the periphery of said body and adapted to be turned into upright positions over the center of the rack.

In testimony whereof we affix our signatures in presence of two witnesses.

FRANK J. VIERLING.
FRED R. BARTHOLOMEW.
MILO H. SMITH.

Witnesses:
WINIFRED I. WARD,
HARRY D. KILGORE.